US006996558B2

(12) United States Patent
Dettinger et al.

(10) Patent No.: US 6,996,558 B2
(45) Date of Patent: *Feb. 7, 2006

(54) APPLICATION PORTABILITY AND EXTENSIBILITY THROUGH DATABASE SCHEMA AND QUERY ABSTRACTION

(75) Inventors: Richard Dean Dettinger, Rochester, MN (US); Peter John Johnson, Rochester, MN (US); Richard Joseph Stevens, Mantorville, MN (US); Ikhua Tong, Rochester, MN (US); Eric Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 590 days.

This patent is subject to a terminal disclaimer.

(21) Appl. No.: 10/083,075

(22) Filed: Feb. 26, 2002

(65) Prior Publication Data
US 2003/0172056 A1 Sep. 11, 2003

(51) Int. Cl.
*G06F 17/30* (2006.01)
(52) U.S. Cl. .......................... 707/4; 707/102
(58) Field of Classification Search ................ 707/4, 707/102, 5, 10, 1, 100, 3, 103 R, 104.1, 8
See application file for complete search history.

(56) References Cited

U.S. PATENT DOCUMENTS 5,734,887 A * 3/1998 Kingberg et al. ............ 707/4
6,553,368 B2 * 4/2003 Martin et al. ............... 707/3
6,725,227 B1 4/2004 Li .............................. 707/102
2002/0078068 A1 * 6/2002 Krishnaprasad et al. .. 707/104.1

OTHER PUBLICATIONS

IBM U.S. Appl. No. 10/132,228, filed on Apr. 25, 2002, "Dynamic End User Specific Customization of an Application's Physical Data Layer Through a Data Repository Abstraction Layer" (ROC920020088US1).

IBM U.S. Appl. No. 10/131,984, filed on Apr. 25, 2002, "Remote Data Access and Integration of Distributed Data Sources Through Data Schema and Query Abstraction" (ROC920020089US1).

IBM U.S. Appl. No. 10/153,977, filed May 23, 2002, "Dynamic Content Generation /Regeneration for a Database Schema Abstraction" (ROC920020096US1).

* cited by examiner

*Primary Examiner*—Luke S Wassum
*Assistant Examiner*—Gwen Liang
(74) *Attorney, Agent, or Firm*—Moser, Patterson & Sheridan, LLP (57) ABSTRACT

The present invention generally is directed to a system, method and article of manufacture for accessing data independent of the particular manner in which the data is physically represented. In one embodiment, a data repository abstraction layer provides a logical view of the underlying data repository that is independent of the particular manner of data representation. A query abstraction layer is also provided and is based on the data repository abstraction layer. A runtime component performs translation of an abstract query into a form that can be used against a particular physical data representation.

26 Claims, 5 Drawing Sheets

APPLICATION PORTABILITY AND EXTENSIBILITY THROUGH DATABASE SCHEMA AND QUERY ABSTRACTION

BACKGROUND OF THE INVENTION

1. Field of the Invention

The present invention generally relates to data processing and more particularly to accessing data independent of the particular manner in which the data is physically represented.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation. As a result of these limitations, a number of difficulties arise.

One difficulty is that changes in the underlying relational data model require changes to the SQL foundation that the corresponding application is built upon. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements driven by each unique relational schema. Yet another difficulty is evolution of the application to work with alternate data representations because SQL is designed for use with relational systems. Extending the application to support alternative data representations, such as XML, requires rewriting the application's data management layer to use non-SQL data access methods.

A typical approach used to address the foregoing problems is software encapsulation. Software encapsulation involves using a software interface or component to encapsulate access methods to a particular underlying data representation. An example is found in the Enterprise JavaBean (EJB) specification that is a component of the Java 2 Enterprise Edition (J2EE) suite of technologies. In the cases EJB, entity beans serve to encapsulate a given set of data, exposing a set of Application Program Interfaces (APIs) that can be used to access this information. This is a highly specialized approach requiring the software to be written (in the form of new entity EJBs) whenever a new set of data is to be accessed or when a new pattern of data access is desired. The EJB model also requires a code update, application built and deployment cycle to react to reorganization of the underlying physical data model or to support alternative data representations. EJB programming also requires specialized skills, since more advanced Java programming techniques are involved. Accordingly, the EJB approach and other similar approaches are rather inflexible and costly to maintain for general-purpose query applications accessing an evolving physical data model.

Another shortcoming of the prior art, is the manner in which information can be presented to the user. A number of software solutions support the use of user-defined queries, in which the user is provided with a tool to construct a query that meets the user's specific data selection requirements. In an SQL-based system, the user is given a list of underlying database tables and columns to choose from when building a query. The user must decide which tables and columns to access based on the naming convention used by the database administrator. This approach does not provide an effective way to subset the set of information presented to the user. As a result, even nonessential content is revealed to the user.

Therefore, there is a need for an improved and more flexible method for accessing data which is not limited to the particular manner in which the underlying physical data is represented.

SUMMARY OF THE INVENTION

The present invention generally is directed to a method, system and article of manufacture for accessing data independent of the particular manner in which the data is physically represented.

One embodiment provides a method of providing access to data having a particular physical data representation. The method comprises providing, for a requesting entity, a query specification comprising a plurality of logical fields for defining an abstract query; and providing mapping rules which map the plurality of logical fields to physical entities of the data.

Another embodiment provides a method of accessing data having a particular physical data representation. The method comprises issuing an abstract query by a requesting entity according to a query specification of the requesting entity; wherein the query specification provides a definition for the abstract query according to logical fields; and transforming the abstract query into a query consistent with the particular physical data representation according to mapping rules which map the logical fields to physical entities of the data.

Yet another embodiment provides a computer-readable medium containing a program which, when executed by a processor, performs an operation of providing access to data having a particular physical data representation. The program comprises a query specification for a requesting entity, the query specification comprising a plurality of logical fields for defining an abstract query; and mapping rules which map the plurality of logical fields to physical entities of the data.

Still another embodiment provides a computer-readable medium containing a program which, when executed by a processor, performs an operation of accessing data having a particular physical data representation. The operation comprises issuing an abstract query by a requesting entity according to a query specification of the requesting entity; wherein the query specification provides a definition for the abstract query according to logical fields; and transforming the abstract query into a query consistent with the particular physical data representation according to mapping rules which map the logical fields to physical entities of the data.

Still another embodiment provides a computer comprising a memory containing at least (i) a requesting entity comprising a query specification providing a definition for an abstract query according to logical fields, (ii) a data repository abstraction component comprising mapping rules which map the logical fields to physical entities of data, and (iii) a runtime component for transforming the abstract query into a query consistent with the physical entities of data according to the mapping rules; and a processor adapted to execute contents of the memory.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally is directed to a system, method and article of manufacture for accessing data independent of the particular manner in which the data is physically represented. In one embodiment, a data repository abstraction layer provides a logical view of the underlying data repository that is independent of the particular manner of data representation. A query abstraction layer is also provided and is based on the data repository abstraction layer. A runtime component performs translation of an abstract query into a form that can be used against a particular physical data representation.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Figure 1:
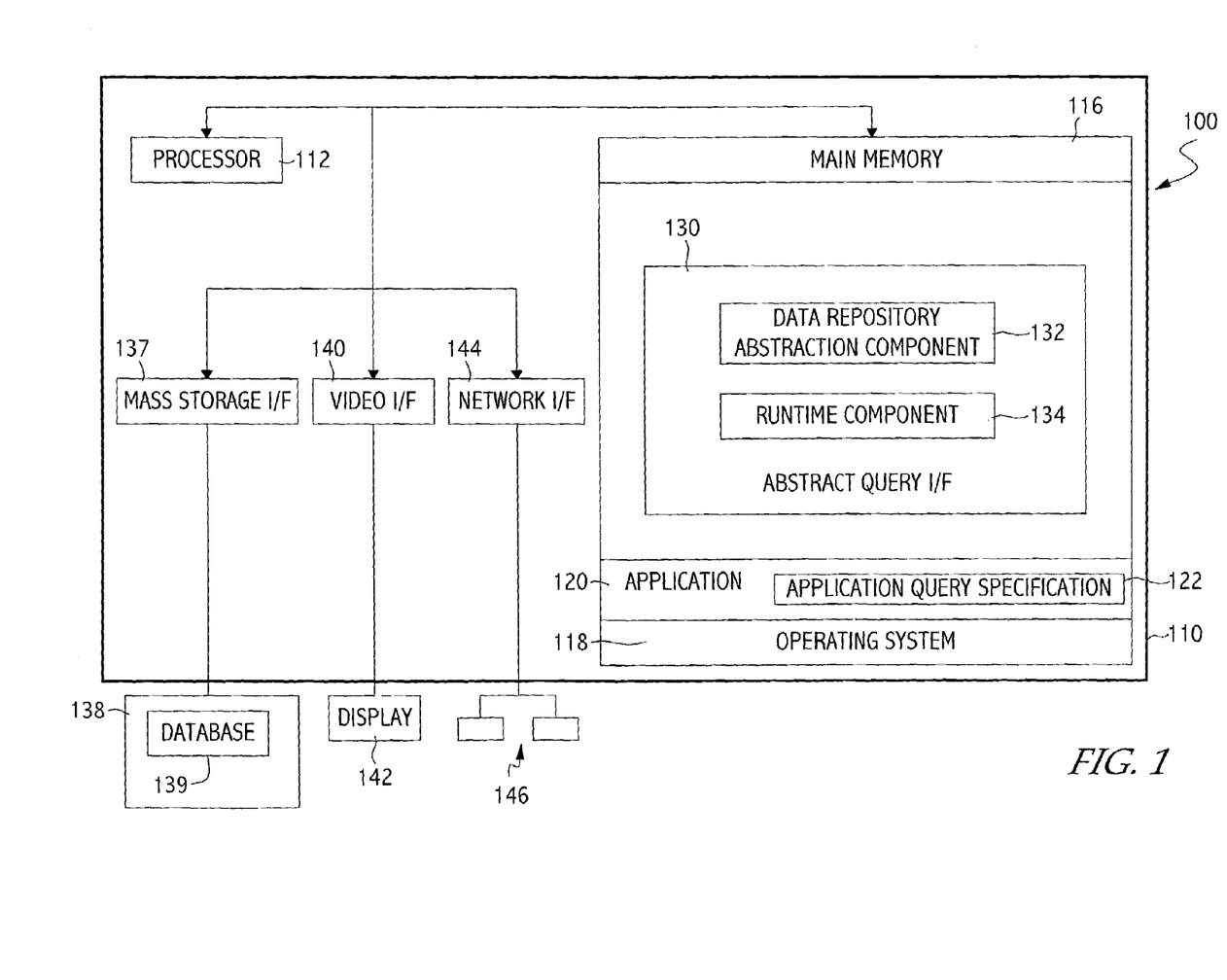
FIG. 1 is a computer system illustratively utilized in accordance with the invention.

Referring now to FIG. 1, a computing environment 100 is shown. In general, the distributed environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer system 110 via bus 114.

The memory 116 is shown configured with an operating system 108. The operating system 118 is the software used for managing the operation of the computer system 100. Examples of the operating system 108 include IBM OS/400®, UNIX, Microsoft Windows®, and the like.

The memory 116 further includes one or more applications 120 and an abstract query interface 130. The applications 120 and the abstract query interface 130 are software products comprising a plurality of instructions that are resident at various times in various memory and storage devices in the computer system 100. When read and executed by one or more processors 112 in the computer system 100, the applications 120 and the abstract query interface 130 cause the computer system 100 to perform the steps necessary to execute steps or elements embodying the various aspects of the invention. The applications 120 (and more generally, any requesting entity, including the operating system 118) are configured to issue queries against a database 139 (shown in storage 138). The database 139 is representative of any collection of data regardless of the particular physical representation. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") are composed using logical fields defined by the abstract query interface 130. In particular, the logical fields used in the abstract queries are defined by a data repository abstraction component 132 of the abstract query interface 130. The abstract queries are executed by a runtime component 134 which transforms the abstract queries into a form consistent with the physical representation of the data contained in the database 139. The application query specification 122 and the abstract query interface 130 are further described with reference to FIG. 2.

Figure 2A:
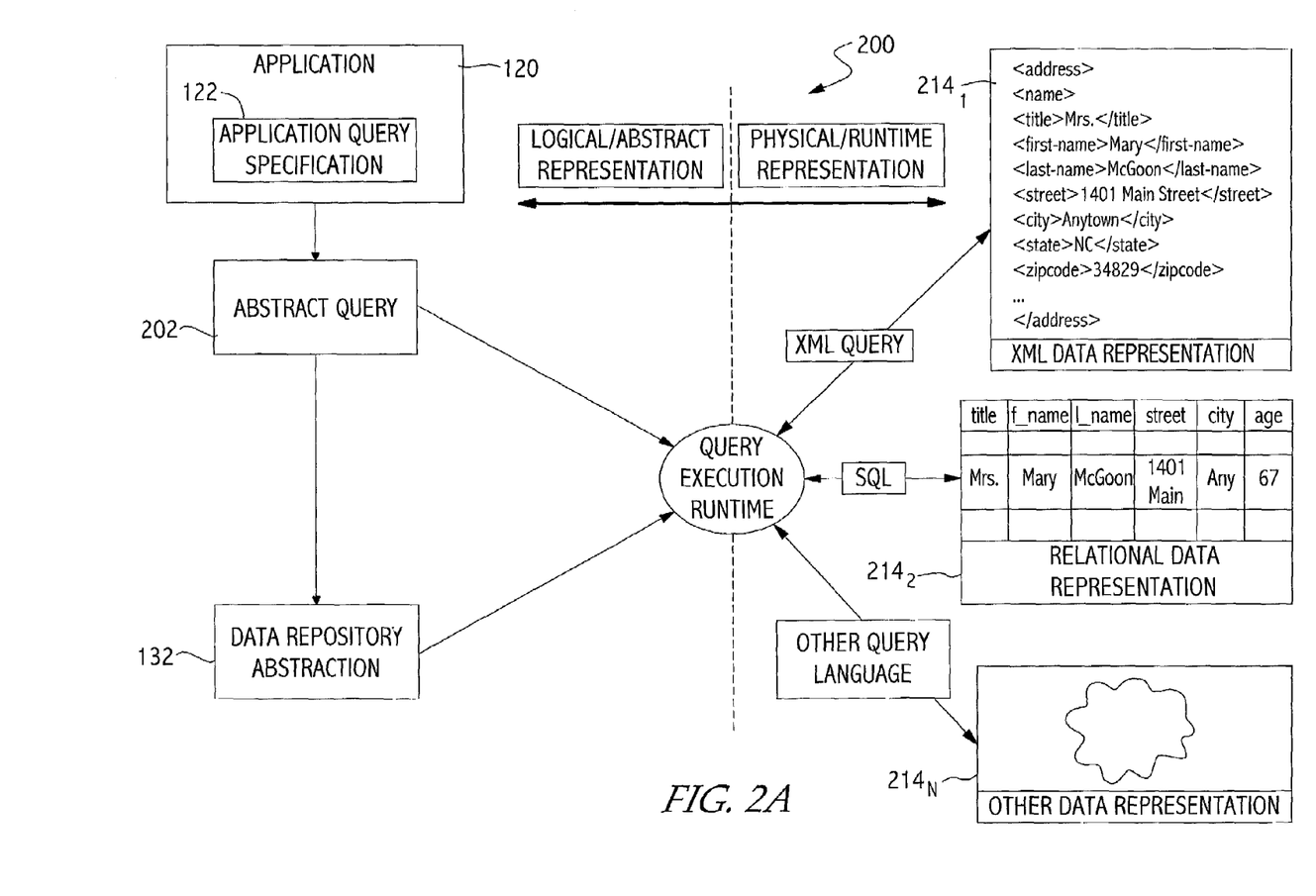
FIGS. 2A and 2B (collectively FIG. 2) show a relational view of software components of one embodiment of the invention.
Figure 2B:
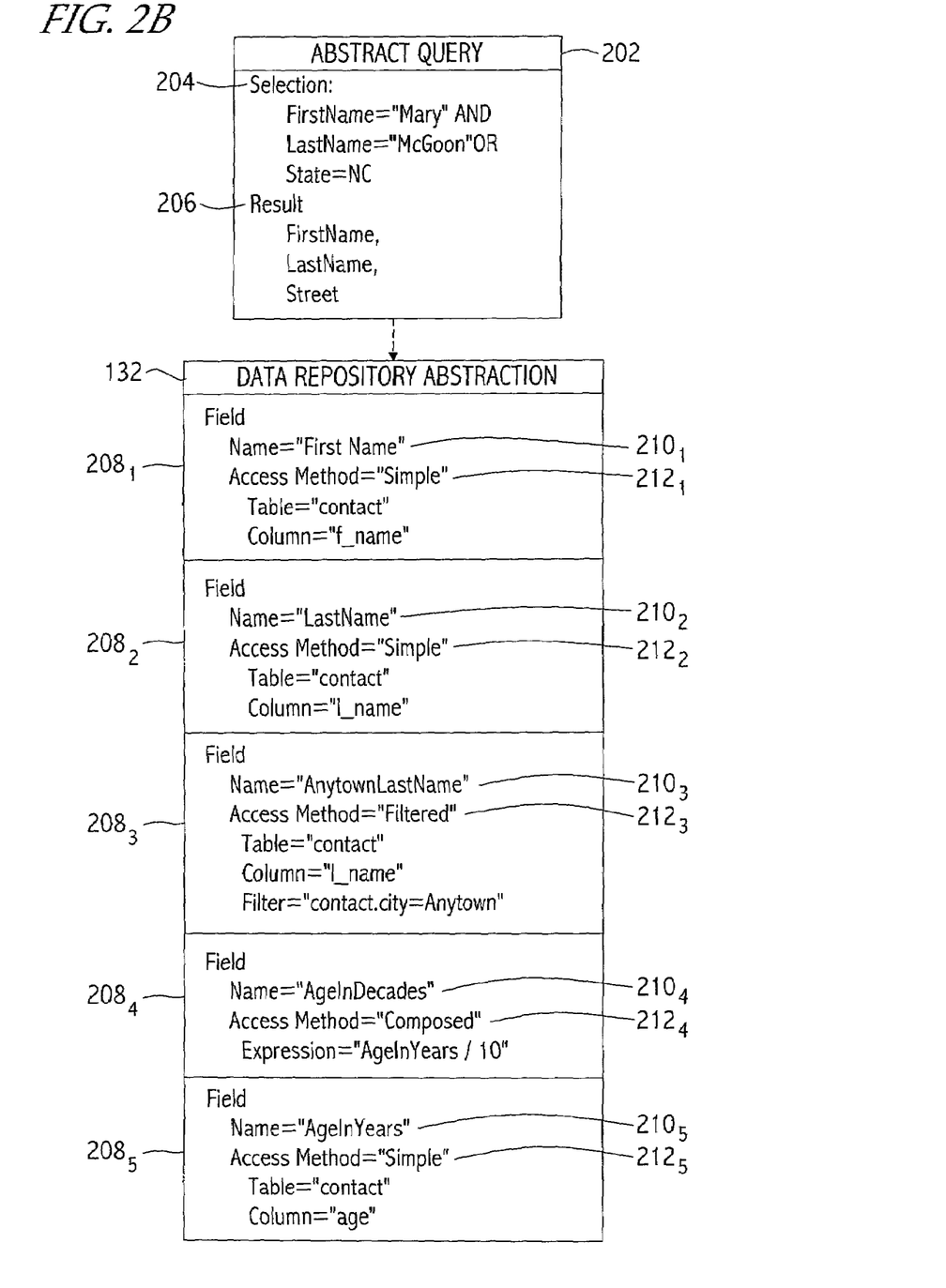

FIGS. 2A–B show an illustrative relational view 200 of components of the invention. The requesting entity (e.g., one of the applications 120) issues a query 202 as defined by the respective application query specification 122 of the requesting entity. The resulting query 202 is generally referred to herein as an "abstract query" because the query is composed according to abstract (i.e., logical) fields rather than by direct reference to the underlying physical data entities in the database 139. As a result, abstract queries may be defined that are independent of the particular underlying data representation used. In one embodiment, the application query specification 122 may include both criteria used for data selection (selection criteria 204) and an explicit specification of the fields to be returned (return data specification 206) based on the selection criteria 204.

The logical fields specified by the application query specification 122 and used to compose the abstract query 202 are defined by the data repository abstraction component 132. In general, the data repository abstraction component 132 exposes information as a set of logical fields that may be used within a query (e.g., the abstract query 202) issued by the application 120 to specify criteria for data selection and specify the form of result data returned from a query operation. The logical fields are defined independently of the underlying data representation being used in the database 139, thereby allowing queries to be formed that are loosely coupled to the underlying data representation.

In general, the data repository abstraction component 132 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$ ... $214_N$ in a database (e.g., database 139). By way of illustration, two data representations are shown, an XML data representation $214_1$ and a relational data representation $214_2$. However, the physical data representation $214_N$ indicates that any other data representation, known or unknown, is contemplated. In one embodiment, a single data repository abstraction component 132 contains field specifications (with associated access methods) for two or more physical data representations 214. In an alternative embodiment, a different single data repository abstraction component 132 is provided for each separate physical data representation 214.

Any number of access methods are contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may computed. In the example illustrated in FIG. 2B the composed field access method $212_3$ maps the logical field name $210_3$ "AgeInDecades" to "AgeInYears/ 10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data repository abstraction component 132 shown in FIG. 2 are representative of logical fields mapped to data represented in the relational data representation $214_2$. However, other instances of the data repository extraction component 132 map logical fields to other physical data representations, such as XML.

An illustrative abstract query corresponding to the abstract query 202 shown in FIG. 2 is shown in Table I below. By way of illustration, the Data Repository Abstraction 132 is defined using XML. However, any other language may be used to advantage.

TABLE I

QUERY EXAMPLE

```
001   <?xml version="1.0"?>
002   <!--Query string representation: (FirstName = "Mary" AND
      LastName =
003   "McGoon") OR State = "NC"-->
004   <QueryAbstraction>
005     <Selection>
006       <Condition internalID="4">
007         <Condition field="FirstName" operator="EQ"value=
            "Mary"
008   internalID="1"/>
009         <Condition field="LastName" operator="EQ" value=
            "McGoon"
010   internalID="3" relOperator="AND"></Condition>
011       </Condition>
012       <Condition field="State" operator="EQ" value="NC"
            internalID="2"
013   relOperator="OR"></Condition>
```

TABLE I-continued

QUERY EXAMPLE

```
014     </Selection>
015     <Results>
016       <Field name="FirstName"/>
017       <Field name="LastName"/>
018       <Field name="State"/>
019     </Results>
020   </QueryAbstraction>
```

Illustratively, the abstract query shown in Table I includes a selection specification (lines 005–014) containing selection criteria and a results specification (lines 015–019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative abstract query corresponding to the Data Repository Abstraction 132 shown in FIG. 2 is shown in Table II below. By way of illustration, the Data Repository Abstraction 132 is defined using XML. However, any other language may be used to advantage.

TABLE II

DATA REPOSITORY ABSTRACTION EXAMPLE

```
001   <?xml version="1.0"?>
002   <DataRepository>
003     <Category name="Demographic">
004       <Field queryable="Yes" name="FirstName" displayable=
      "Yes">
005         <AccessMethod>
006           <Simple columnName="f_name" tableName="contact">
              </Simple>
007         </AccessMethod>
008         <Type baseType="char"></Type>
009       </Field>
010       <Field queryable="Yes" name="LastName" displayable=
      "Yes">
011         <AccessMethod>
012           <Simple columnName="l_name" tableName="contact">
              </Simple>
013         </AccessMethod>
014         <Type baseType="char"></Type>
015       </Field>
016       <Field queryable="Yes" name="State" displayable="Yes">
017         <AccessMethod>
018           <Simple columnName="state" tableName="contact38 >
            </Simple>
019         </AccessMethod>
020         <Type baseType="char"></Type>
021       </Field>
022     </Category>
023   </DataRepository>
```

Figure 3:
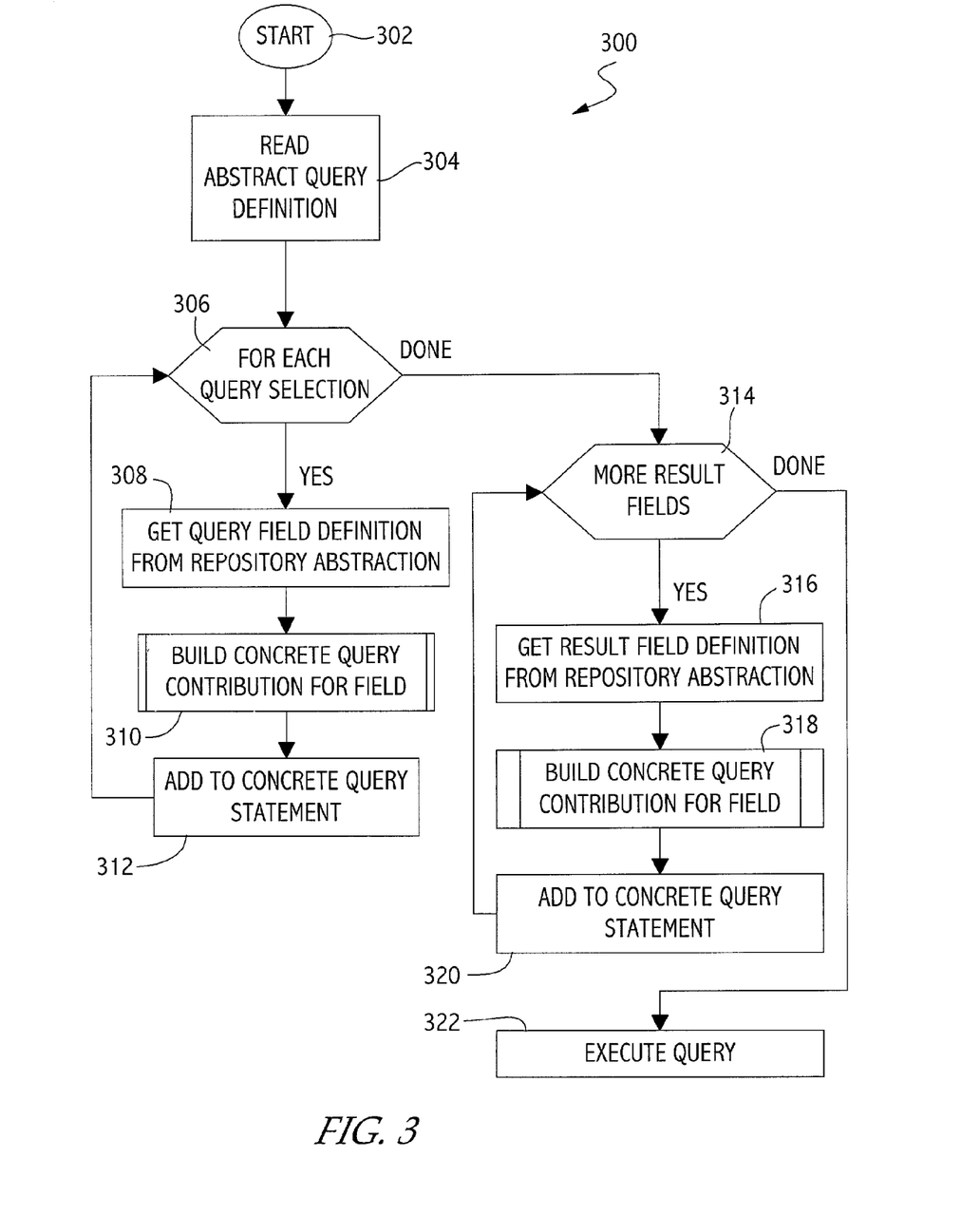
FIG. 3 is a flow chart illustrating the operation of a runtime component.

FIG. 3 shows an illustrative runtime method 300 exemplifying one embodiment of the operation of the runtime component 134. The method 300 is entered at step 302 when the runtime component 134 receives as input an instance of an abstract query (such as the abstract query 202 shown in FIG. 2). At step 304, the runtime component 134 reads and parses the instance of the abstract query and locates individual selection criteria and desired result fields. At step 306, the runtime component 134 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 134 uses the field name from a selection criterion of the abstract query to look up the definition of the field in the data repository abstraction 132. As noted above, the field definition includes a definition of the access method used to access the physical data associated with the field. The runtime component 134 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 134 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 134 looks up a result field name (from the result specification of the abstract query) in the data repository abstraction 132 and then retrieves a Result Field Definition from the data repository abstraction 132 to identify the physical location of data to be returned for the current logical result field. The runtime component 134 then builds (as step 318) a Concrete Query Contribution (of the concrete query that identifies physical location of data to be returned) for the logical result field. At step 320, Concrete Query Contribution is then added to the Concrete Query Statement. Once each of the result specifications in the abstract query has been processed, the query is executed at step 322.

Figure 4:
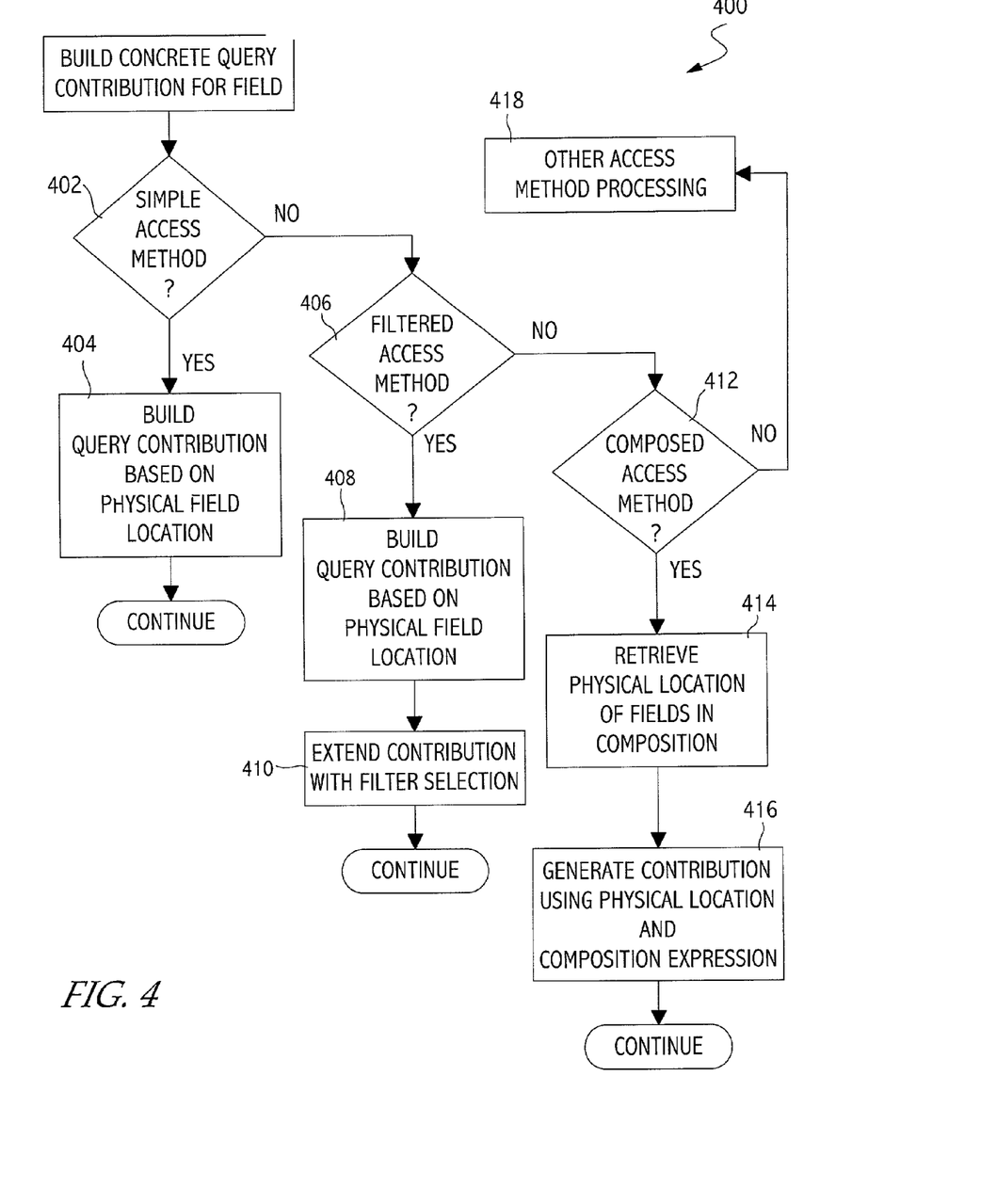
FIG. 4 is a flow chart illustrating the operation of a runtime component.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

In various embodiments, the invention provides numerous advantages over the prior art. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case with a given physical data representation is modified or restructured, the corresponding data repository abstraction is updated to reflect changes made to the underlying physical data model. The same set of logical fields are available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

In another aspect, the invention facilitates ease-of-use for the application builder and the end-user. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

It should be noted that any reference herein to particular values, definitions, programming languages and examples is merely for purposes of illustration. Accordingly, the invention is not limited by any particular illustrations and examples. Further, while aspects of the invention are described with reference to SELECTION operations, other input/output operation are contemplated, including well-known operations such as ADD, MODIFY, INSERT, DELETE and the like. Of course, certain access methods may place restrictions on the type of abstract query functions that can be defined using fields that utilize that particular access method. For example, fields involving composed access methods are not viable targets of MODIFY, INSERT and DELETE.

While the foregoing is directed to embodiments of the present invention, other and further embodiments of the invention may be devised without departing from the basic scope thereof, and the scope thereof is determined by the claims that follow.

What is claimed is:

1. A computer-implemented method of providing access to data having a particular physical data representation, comprising:
   providing a plurality of logical field definitions, each of the definitions comprising a logical field name, at least one location attribute identifying a location of physical data corresponding to the logical field name, and a reference to an access method selected from at least two different access method types; wherein each of the different access method types defines a different manner of exposing the physical data corresponding to the logical field name of the respective logical field definition: and
   providing, for a requesting entity, a query specification defining an interface to the plurality of logical field definitions thereby allowing abstract queries to be composed on the basis of the plurality of logical field definitions.

2. The method of claim 1, wherein a first access method type is a simple access method defining a direct relationship between physical data located at a location identified by a respective location attribute of a respective logical field definition; and wherein a second access method type is a filtered access method defining a filter applied to physical data located at a location identified by a respective location attribute of a respective logical field definition, wherein the filter removes selected data from the physical data so that only a subset of the physical data is exposed by the respective logical field definition referencing the filtered access method.

3. The method of claim 1, wherein the access method types comprise a filtered access method defining a filter applied to physical data located at a location identified by a respective location attribute of a respective logical field definition, wherein the filter removes selected data from the physical data so that only a subset of the physical data is exposed by the respective logical field definition referencing the filtered access method.

4. The method of claim 1, wherein the access method types comprise a composed access method defining an expression applied to physical data located at a location identified by a respective location attribute of a respective logical field definition, wherein application of the expression produces values different from the physical data to which the expression is applied.

5. The method of claim 1, wherein the plurality of logical field definitions are defined within a single markup language documents.

6. The method of claim 1, wherein the abstract query comprises:
   at least one selection criterion specifying at least one condition defined on the basis of the one or more of the plurality of logical field definitions; and
   a result specification specifying one or more of the plurality of logical field definitions to be returned as results for each of the abstract queries.

7. A computer-implemented method of accessing physical data having a particular physical data representation, comprising:
   issuing an abstract query by a requesting entity according to a query specification of the requesting entity; wherein the query specification defines an interface to a data abstraction model defining a plurality of logical field definitions mapping logical fields to the physical data and wherein the abstract query is composed on the basis of the plurality of logical field definitions; and
   transforming the abstract query into a query consistent with the particular physical data representation according to the data abstraction model depending on which of the plurality of logical fields definitions are referenced by the abstract query, wherein each of the logical field definitions comprises a logical field name, at least one location attribute identifying a location of physical data corresponding to the logical field name, and a reference to an access method selected from at least two different access method types; wherein each of the different access method types defines a different manner of exposing the physical data corresponding to the logical field name of the respective logical field definition.

8. The method of claim 7, wherein a first access method type is a simple access method defining a direct relationship between physical data located at a location identified by a respective location attribute of a respective logical field definition; and wherein a second access method type is a filtered access method defining a filter applied to physical data located at a location identified by a respective location attribute of a respective logical field definition, wherein the filter removes selected data from the physical data so that only a subset of the physical data is exposed by the respective logical field definition referencing the filtered access method.

9. The method of claim 7, wherein the access method types comprise a filtered access method defining a filter applied to physical data located at a location identified by a respective location attribute of a respective logical field definition, wherein the filter removes selected data from the physical data so that only a subset of the physical data is exposed by the respective logical field definition referencing the filtered access method.

10. The method of claim 7, wherein the access method types comprise a composed access method defining an expression applied to physical data located at a location identified by a respective location attribute of a respective logical field definition, wherein application of the expression produces values different from the physical data to which the expression is applied.

11. The method of claim 7, wherein the abstract query comprises:
   at least one selection criterion specifying at least one condition defined on the basis of the one or more of the plurality of logical field definitions; and
   a result specification specifying one or more of the plurality of logical field definitions to be returned as results for the abstract query.

12. A computer-readable medium containing a program which, when executed by a processor, performs an operation of providing access to data having a particular physical data representation, the program comprising:
   a data abstraction model comprising a plurality of logical field definitions each mapping to different elements of the data, wherein each of the logical field definitions comprises a logical field name, at least one location attribute identifying a location of physical data corresponding to the logical field name, and a reference to an access method selected from at least two different access method types, and wherein each of the different access method types defines a different manner of exposing the physical data corresponding to the logical field name of the respective logical field definition, wherein the data abstraction model is configured to be referenced by a requesting entity to compose abstract queries on the basis of the plurality of logical field definitions.

13. The computer-readable medium of claim 12, wherein a first access method type is a simple access method defining a direct relationship between physical data located at a location identified by a respective location attribute of a respective logical field definition; and wherein a second access, method type is a filtered access method defining a filter applied to physical data located at a location identified by a respective location attribute of a respective logical field definition, wherein the filter removes selected data from the physical data so that only a subset of the physical data is exposed by the respective logical field definition referencing the filtered access method.

14. The computer-readable medium of claim 12, wherein the access method types comprise a filtered access method defining a filter applied to physical data located at a location identified by a respective location attribute of a respective logical field definition, wherein the filter removes selected data from the physical data so that only a subset of the physical data is exposed by the respective logical field definition referencing the filtered access method.

15. The computer-readable medium of claim 12, wherein the access method types comprise a composed access method defining an expression applied to physical data located at a location identified by a respective location attribute of a respective logical field definition, wherein application of the expression produces values different from the physical data to which the expression is applied.

16. The computer-readable medium of claim 12, wherein the program further comprises a runtime component configured to:
   transform an abstract query, received from the requesting entity, into a query consistent with the particular physical data representation and according to the data abstraction model depending on which of the plurality of logical fields definitions are referenced by the abstract query.

17. The computer-readable medium of claim 16, wherein the plurality of logical field definitions are defined within a single extensible markup language (XML) document.

18. A computer-readable medium containing a program which, when executed by a processor, performs an operation of accessing data having a particular physical data representation, the operation comprising:
   receiving an abstract query by a requesting entity according to a query specification of the requesting entity; wherein the query specification defines an interface to a data abstraction model defining a plurality of logical field definitions mapping logical fields to the physical data and wherein the abstract query is composed on the basis of the plurality of logical field definitions; and
   transforming the abstract query into a query consistent with the particular physical data representation according to the data abstraction model depending on which of the plurality of logical fields definitions are referenced by the abstract query, wherein each of the logical field definitions comprises a logical field name, at least one location attribute identifying a location of physical data corresponding to the logical field name, and a reference to an access method selected from at least two different access method types; wherein each of the different access method types defines a different manner of exposing the physical data corresponding to the logical field name of the respective logical field definition.

19. The computer-readable medium of claim 18, wherein a first access method type is a simple access method defining a direct relationship between physical data located at a location identified by a respective location attribute of a respective logical field definition; and wherein a second access method type is a filtered access method defining a filter applied to physical data located at a location identified by a respective location attribute of a respective logical field definition, wherein the filter removes selected data from the physical data so that only a subset of the physical data is exposed by the respective logical field definition referencing the filtered access method.

20. The computer-readable medium of claim 18, wherein the access method types comprise a filtered access method defining a filter applied to physical data located at a location identified by a respective location attribute of a respective logical field definition, wherein the filter removes selected data from the physical data so that only a subset of the physical data is exposed by the respective logical field definition referencing the filtered access method.

21. The computer-readable medium of claim 18, wherein the access method types comprise a composed access method defining an expression applied to physical data located at a location identified by a respective location attribute of a respective logical field definition, wherein application of the expression produces values different from the physical data to which the expression is applied.

22. The computer-readable medium of claim 18, wherein the abstract query comprises:
- at least one selection criterion specifying at least one condition defined on the basis of the one or more of the plurality of logical field definitions; and
- a result specification specifying one or more of the plurality of logical field definitions to be returned as results for the abstract query.

23. A computer, comprising:
a memory containing at least:
(i) a data abstraction model which maps logical fields to physical data organized according to a particular data representation, the data abstraction model comprising a plurality of logical field definitions each mapping to different elements of the data; wherein each of the logical field definitions comprises a logical field name, at least one location attribute identifying a location of physical data corresponding to the logical field name, and a reference to an access method selected from at least two different access method types; and wherein each of the different access method types defines a different manner of exposing the physical data corresponding to the logical field name of the respective logical field definition; wherein the data abstraction model is configured to be referenced by a requesting entity to compose abstract queries on the basis of the plurality of logical field definitions; and
(ii) a runtime component configured to transform an abstract query, received from the requesting entity, into a query consistent with the particular physical data representation and according to the data abstraction model depending on which of the plurality of logical fields definitions are referenced by the abstract query; and
a processor adapted to execute contents of the memory.

24. The computer of claim 23, wherein a first access method type is a simple access method defining a direct relationship between physical data located at a location identified by a respective location attribute of a respective logical field definition; and wherein a second access method type is a filtered access method defining a filter applied to physical data located at a location identified by a respective location attribute of a respective logical field definition, wherein the filter removes selected data from the physical data so that only a subset of the physical data is exposed by the respective logical field definition referencing the filtered access method.

25. The computer of claim 23, wherein the access method types comprise a filtered access method defining a filter applied to physical data located at a location identified by a respective location attribute of a respective logical field definition, wherein the filter removes selected data from the physical data so that only a subset of the physical data is exposed by the respective logical field definition referencing the filtered access method.

26. The computer of claim 23, wherein the access method types comprise a composed access method defining an expression applied to physical data located at a location identified by a respective location attribute of a respective logical field definition, wherein application of the expression produces values different from the physical data to which the expression is applied.

* * * * *